Patented May 15, 1934

UNITED STATES PATENT OFFICE 1,958,614

RESINOUS PRODUCTS OR COMPOSITIONS INCLUDING LACQUERS, PAINTS, VARNISHES AND OTHER COATING COMPOSITIONS

Carleton Ellis, Montclair, N. J., assignor to Ellis-Foster Company, a corporation of New Jersey No Drawing. Original application October 10, 1925, Serial No. 61,839. Divided and this application May 28, 1930, Serial No. 456,816

21 Claims. (Cl. 260—8)

This invention relates to resinous products or compositions including lacquers, paints, varnishes and other coating compositions, and the like, and relates especially to resinous products or compositions preferably containing the products of reaction of glycerol, a crystalline organic acid, oily material comprising tung oil or the fatty acids thereof and a natural resin such as rosin.

As set forth in my application Serial No. 61,839 of which this is a division glycerol in its various forms, dilute, concentrated, crude or refined, or polyglycerol or glycerol ethers may be used; also other analogous polyhydric alcohols such as glycol, e. g., ethylene or propylene glycol, diethylene glycol, and the like. Mixtures of these polyhydric alcohols or alcohol ethers likewise may be used in some cases. The crystalline organic acid includes such aliphatic acids as tartaric, citric, malic, maleic, fumaric, mucic, succinic acids, and so forth; likewise aromatic acids such as phthalic, diphenic or other polybasic acids, or benzoic, salicylic or similar monobasic acids. The anhydrides of these acids may be used to advantage in some cases. Phthalic anhydride in view of its low cost and the character of the resinous bodies produced may be used advantageously. Hence I may employ not only the acids themselves, but substances yielding these acids during the course of the reaction. Mixtures of crystalline acids also may be employed. In this group of crystalline acids I prefer to employ those of 10 or 12 carbons or less, these being mostly fairly water-soluble and crystallizable, forming resins readily with glycerol which when soluble in organic solvents are usually rather easily affected by water. A very substantial degree of water-resistance is conferred by bringing into the reaction a siccative or drying oil of the nature of tung oil and the acid of a natural resin. Either pure tung oil itself or the fatty acids thereof, or mixtures of these glycerides and the fatty acid thereof, may be used. It is sometimes opportune to use a glyceride oil which is somewhat acid, thereby securing cheaply an advantageous mixture of glyceride and its oil acid. Likewise, fatty oils or fatty acids forming the oily component or siccative oil constituent include those preferably of at least 12 carbon atoms and preferably 16 or 18 carbon atoms and upwards in the molecule. This group may include cyclic acids such as naphthenic acids in some cases, used especially in conjunction with tung oil and/or its fatty acids. In general the oily component conferring such water-resistance should preferably contain a siccative constituent, e. g., the fatty acids of a drying or semi-drying oil, specifically acids with two or more double bonds, that is, having a higher degree of unsaturation than oleic acid. The latter acid, however, may be present. Tung oil therefore conforms excellently to this preferred requirement. A specific and in some cases desirable form of fatty oil or fatty acids is that prepared by blowing the oily material. In this way various drying or semi-drying oils may be blown and used in the present composition. A blown tung oil may be used alone or it may be mixed with other blown oils, such as blown rapeseed oil. Mixtures of blown and unblown oils likewise may be used. It has been noted in the specification mentioned above that in the case of the blown oils the oxygen which is combined with the oil through the operation of blowing apparently serves as a locus of reaction to enable a deep-seated resinification to take place. Among the oils which may be used in addition to tung oil are linseed, fish, whale, rape, perilla, soya bean, sunflower, corn and cottonseed oils and their fatty acids. Any of these or others of a similar character may be employed with the tung component of the present invention. Tung oil has an especial degree of waterproofing power and hence is employed as a component of the polyhydric alcohol resin to advantage. Tung oil and rosin are even more water-resistant and the present invention proposes in part to avail of these substances to enhance the water-resistance of the resinous product. In Serial 61,839 the employment of resin acids such as those of ordinary rosin is proposed. These resin acids may be conveniently used in the form of the natural resins themselves, such as ordinary rosin or colophony or they may take a more purified form such as abietic acid. In like manner congo, pontianac and other natural resins of an acid character may be utilized or mixtures of such natural resins of an acid character. These natural resins, in general, have an acid number in excess of 50.

In the present invention I preferably aim to produce soluble resins and desire especially resins soluble in organic solvents used in the making of lacquers or in the production of varnishes.

In the following examples the proportions given are parts by weight:

| Example | 1 | 2 | 3 | 4 | 5 |
|---|---|---|---|---|---|
| Glycerol | 101 | 101 | 101 | 79 | 142 |
| Phthalic anhydride | 164 | 164 | 164 | 114 | 230 |
| Tung oil | 46.5 | 93 | 140 | 39 | 114 |
| Rosin | 200 | 200 | 200 | 200 | 200 |

These resins may be prepared by heating the several components together to a temperature of 285–290° C. and maintaining this temperature for one-half hour to one hour or longer, according to the size of the batch which is being prepared.

Prepared in proportions as given above the tung oil will be found to combine at a temperature as low as 200–210° C. This temperature of combination will, however, depend somewhat on the proportions of the other ingredients. It is understood that where tung oil is specified the fatty acids of this oil may be used or a mixture of the oil and its fatty acids.

Nitrocellulose solvents may be used to dissolve resins thus prepared and enable their incorporation with a cellulose compound such as nitrocellulose, especially low vicosity nitrocellulose. Thus resins 1 and 4 may be incorporated with nitrocellulose to form clear lacquer by using resin 20 parts by weight, nitrocellulose 5 parts, butyl acetate 30 parts, toluene 20 parts and ethyl alcohol 2 parts.

In general I may follow the procedure set forth in Serial 61,839 for the preparation of lacquer solutions with the aforesaid type of resin, using nitrocellulose, especially low viscosity soluble cotton, employing various proportions, say equal parts, in a solvent mixture such as benzol-anhydrous ethyl alcohol for the alcohol-solvent type of nitrocellulose or butyl acetate-butanol for nitrocellulose not possessing this particular form of solubility. Other solvents such as ethyl carbonate, furfural, xylol, amyl acetate, acetone, methyl alcohol, and the like, may be employed according to requirements. Lacquer coatings of this character have shown a very great resistance on exposure tests.

The softer forms of the resins require no softeners or plasticizers, but with the harder resins the employment of diethyl phthalate, diamyl phthalate, tricresyl phosphate, acetin, castor oil and the like is sometimes advantageous, when a very flexible nitrocellulose film is required.

Mixtures of any of the foregoing resins may be made for incorporation with nitrocellulose and other synthetic or natural resins may be added in appropriate and compatible proportion.

Pigments such as prussian blue or titanox should be ground with the vehicle in a ball or tube mill for a considerable period to attain a very fine suspension perhaps partly colloidal or dispersed.

Another phase of the present invention is that the resinification reactions take place without the formation of insoluble products preventing utilization in paints and varnishes. The product of the present invention is applicable in the making of oil varnishes of particular durability.

For this purpose the resin is incorporated by heating with a drying oil such as tung oil, linseed oil, and the like, a mixture of 90 parts tung oil and 10 parts linseed oil (proportions by weight) being desirable. Thus 50 parts of resin as described in Examples 1 to 5 and 78 parts by weight of the linseed tung oil mixture as above were heated together at 320–330° C. and allowed to body at this temperature for about 10 minutes. Then the temperature was allowed to fall to about 200° C. and an equal weight of thinner was added, this being a mixture of equal parts of turpentine and heavy mineral spirits. Finally a liquid drier was introduced and the resulting varnish allowed to settle to clarify or was filtered. A small amount of iron or other metallic substance present may react with phthalic acid or other acid material present to form a compound which is insoluble and which although very slight in amount causes a turbidity that preferably, although not necessarily, should be removed. Settling or filtration as noted accomplishes this.

In the particular oil varnishes represented by the foregoing the drier used was a mixture of lead and manganese compounds in the proportion of 0.5 parts lead and 0.2 parts manganese, based on the non-volatile components of the varnish.

Exterior exposure tests were carried on for a period of five months, using for the purpose panels carrying two coats of varnish. The panels made with varnishes prepared from resins Examples 1 to 5 inclusive did not exhibit any failures during five months' exposure. On the other hand, comparative tests with varnishes made from rosin ester, congo ester and oil soluble phenol formaldehyde resins showed marked indications of deterioration before the lapse of five months. The rosin ester varnish failed five weeks prior to the time the five months' test was discontinued. The congo ester oil varnish showed results slightly better than the rosin ester varnish. Panels coated with the oil varnishes made with the aid of the phenol formaldehyde resins (these being grades readily obtainable in the market) were badly checked at the end of five month. In addition to these comparative tests, panels also were exposed carrying two coats of well known brands of spar varnish, one of which was known to have especially high content of siccative oil and therefore was considered to be of unusual durability. At the end of the five months' exposure test these commercial spar varnishes were in better condition than the ester gum and phenol formaldehyde varnishes, but the surface of both of these spar varnishes were somewhat checked and they were not in the perfect condition of the tung rosin phthalic glyceride compositions of the present invention.

Both lacquers and oil varnishes with or without fillers and/or pigments may be heat-dried or baked after applying to a suitable surface in order to obtain harder and more resistant coatings, and also may be baked in shaped masses for the purpose of forming insulating material or otherwise in the field of plastic molding.

As will be evident from the foregoing, the proportions of the reacting ingredients may be varied according to required conditions. Likewise the order of mixing may be varied if desired. Preferably I heat all the ingredients forming the resin, together, as a one stage procedure as this constitutes a more simple operation than successive additions of the several components. However, in some cases I may form a resin nucleus from two or more of the resinifying constituents and add thereto gradually or otherwise the remaining ingredients.

What I claim is:

1. A resinous product comprising a glycerol mixed ester of tung oil acids, phthalic anhydride and rosin.

2. A resinous product comprising a glycerol mixed ester of tung oil acids, phthalic anhydride and natural resin acid.

3. A resinous product comprising a polyhydric alcohol mixed ester of tung oil acid, linseed oil acid, natural resin acid and polybasic organic acid.

4. A resinous product comprising a polyhydric alcohol mixed ester of tung oil acid, natural resin acid and polybasic organic acid.

5. The process of producing a synthetic resin which comprises heating to reaction temperature a reaction mass containing a polyhydric alcohol, a polybasic acid, a drying oil acid and a natural resin.

6. The process of producing a synthetic resin which comprises heating to reaction temperature a reaction mass containing a polyhydric alcohol, a polybasic acid, a drying oil acid, a natural resin and a drying oil.

7. The process of producing a synthetic resin which comprises heating to reaction temperature a reaction mass containing glycerol, phthalic acid, linseed oil and rosin.

8. The process of claim 5 in which the natural resin has an acid number of at least 50.

9. A new composition of matter comprising a mixed ester in which the alcohol radical is that of a polyhydric alcohol and the acid radicals are those of a polybasic acid, a drying oil acid and a natural resin acid.

10. A coating composition comprising a mixed ester and a solvent therefor, said mixed ester having as the alcohol component a polyhydric alcohol and as the acid components a polybasic acid, a natural resin acid and acids obtainable by the hydrolysis of drying oil.

11. A coating composition comprising a mixed ester of glycerin and a solvent therefor, said mixed ester having as the acid components phthalic acid, a natural resin acid and acids obtainable by the hydrolysis of drying oil.

12. Sheet metal carrying a tightly adhering coating comprising a mixed ester of glycerin having as the acid components phthalic acid, a natural resin acid and acids obtainable by the hydrolysis of drying oil.

13. The process of producing a synthetic resin which comprises heating to reaction temperature a reaction mass containing glycerol, phthalic acid, linseed oil acid and rosin.

14. The process of producing a substantially homogeneous drying-oil-modified polyhydric alcohol-polybasic acid resin which comprises heating to reaction temperature a mass containing the radicals of a polyhydric alcohol and a polybasic acid, with a drying oil and rosin.

15. A resinous product which on saponification yields a polyhydric alcohol, a polybasic acid, a drying oil acid and rosin acids.

16. A resinous product which on saponification yields glycerol, phthalic acid, linseed oil acids, and rosin acids.

17. A resinous product which on saponification yields glycerol, phthalic acid, tung oil acids and rosin acids.

18. A resinous product of tung oil, a natural resin, a resinifying carboxylic organic acid, and a polyhydric alcohol.

19. A resinous product of tung oil, the resin acids of rosin, a resinifying carboxylic acid and glycerol.

20. A resinous product of tung oil, a natural resin acid, phthalic anhydride and a polyhydric alcohol.

21. A resinous product of drying oil acid, resin acid, a resinifying carboxylic acid and a polyhydric alcohol.

CARLETON ELLIS.